(12) United States Patent
Binder et al.

(10) Patent No.: US 7,831,376 B2
(45) Date of Patent: Nov. 9, 2010

(54) METHOD AND DEVICE FOR OPERATING AN INTERNAL COMBUSTION ENGINE

(75) Inventors: Erhard Binder, Regensburg (DE); Christian Schweigert, Regensburg (DE)

(73) Assignee: Continental Automotive GmbH, Hannover (DE)

(*) Notice: Subject to any disclaimer, the term of this patent is extended or adjusted under 35 U.S.C. 154(b) by 294 days.

(21) Appl. No.: 12/093,094

(22) PCT Filed: Oct. 12, 2006

(86) PCT No.: PCT/EP2006/067316
§ 371 (c)(1),
(2), (4) Date: May 8, 2008

(87) PCT Pub. No.: WO2007/054416
PCT Pub. Date: May 18, 2007

(65) Prior Publication Data
US 2008/0295487 A1    Dec. 4, 2008

(30) Foreign Application Priority Data
Nov. 10, 2005   (DE) ..................... 10 2005 053 761

(51) Int. Cl.
| | |
|---|---|
| G06F 19/00 | (2006.01) |
| F02P 5/15 | (2006.01) |
| F02D 41/14 | (2006.01) |
| F02D 41/22 | (2006.01) |
| F01N 3/18 | (2006.01) |

(52) U.S. Cl. ............ 701/111; 123/406.14; 123/406.24; 123/436; 60/274; 60/277; 60/285; 73/114.04; 701/104; 701/109

(58) Field of Classification Search ............ 123/406.14, 123/406.24, 435, 436, 479, 676; 701/101–103, 701/110, 111, 114, 104, 105; 60/274, 277, 60/285, 299; 73/114.02, 114.04
See application file for complete search history.

(56) References Cited

U.S. PATENT DOCUMENTS

| | | | | |
|---|---|---|---|---|
| 5,377,112 A | * | 12/1994 | Brown et al. ................. | 701/115 |
| 5,509,268 A | * | 4/1996 | Kuroda et al. ................. | 60/277 |
| 5,520,161 A | * | 5/1996 | Klopp ......................... | 123/676 |
| 5,956,941 A | * | 9/1999 | Cullen et al. .................. | 60/274 |
| 6,240,343 B1 | * | 5/2001 | Sarangapani et al. ......... | 701/101 |
| 6,244,042 B1 | | 6/2001 | Dickers et al. ................ | 60/274 |
| 6,338,326 B1 | | 1/2002 | Ebeling et al. .............. | 123/198 |

FOREIGN PATENT DOCUMENTS

| | | |
|---|---|---|
| DE | 197 44 067 A1 | 4/1999 |
| DE | 197 44 410 A1 | 4/1999 |
| DE | 199 13 746 C2 | 5/2001 |
| DE | 102 12 428 B4 | 5/2004 |
| DE | 102 60 294 B4 | 3/2005 |

(Continued)

*Primary Examiner*—Willis R Wolfe, Jr.
(74) *Attorney, Agent, or Firm*—King & Spalding L.L.P.

(57) ABSTRACT

An internal combustion engine has a plurality of cylinders and an exhaust tract into which a mixture which is situated in the respective cylinder is introduced in the respective discharge strokes. A combustion misfire rate is determined as a function of at least one operating variable of the internal combustion engine. A temperature in the exhaust tract is determined as a function of the combustion misfire rate.

18 Claims, 7 Drawing Sheets

FOREIGN PATENT DOCUMENTS

| | | | |
|---|---|---|---|
| DE | 103 55 539 A1 | 6/2005 | |
| EP | 1048830 A2 | 10/1997 | |
| JP | 2000248989 A | * | 9/2000 |
| JP | 2000291486 A | * | 10/2000 |
| WO | WO 2007/054416 A1 | 5/2007 | |

* cited by examiner

$$delta\_t\_spark\_mmv_i(t_{k_{calc}}) = \frac{1}{N} \sum_{k=k_{calc}-N+1}^{k_{calc}} \left| \frac{t\_spark_i(t_k) - t\_spark_i(t_{k-1})}{t_k - t_{k-1}} \right| \quad [F1]$$

$$RES_i = delta\_t\_spark\_mmv_i - \frac{1}{M-1} \sum_{j=1; j \neq i}^{M} delta\_t\_spark\_mmv_j \quad [F2]$$

FIG 5

$$t\_spark\_mmv_i(t_{k_{calc}}) = \frac{1}{N} \sum_{k=k_{calc}-N+1}^{k_{calc}} t\_spark_i(t_k) \quad [F3]$$

$$RES_i = t\_spark\_mmv_i - \frac{1}{M-1} \sum_{j=1; j \neq i}^{M} t\_spark\_mmv_j \quad [F4]$$

METHOD AND DEVICE FOR OPERATING AN INTERNAL COMBUSTION ENGINE

CROSS-REFERENCE TO RELATED APPLICATIONS

This application is a U.S. national stage application of International Application No. PCT/EP2006/067316 filed Oct. 12, 2006, which designates the United States of America, and claims priority to German application number 10 2005 053 761.8 filed Nov. 10, 2005, the contents of which are hereby incorporated by reference in their entirety.

TECHNICAL FIELD

The invention relates to a method and a device for operating an internal combustion engine with a number of cylinders and an exhaust gas tract, in which a mixture present in the respective cylinder is brought into the respective exhaust cycles.

BACKGROUND

Ever more stringent regulations regarding permissible pollutant emissions by motor vehicles fitted with internal combustion engines make it necessary to keep the pollutant emissions as low as possible during operation of the internal combustion engine. One of the ways in which this can be done is by reducing the emissions which occur during the combustion of the air/fuel mixture in the relevant cylinder of the internal combustion engine. Another is to use exhaust gas post processing systems in internal combustion engines which convert the emissions which are generated during the combustion process of the air/fuel mixture in the relevant cylinder into harmless substances. Catalyzers are used for this purpose which convert carbon monoxide, hydrocarbons and nitrous oxide into harmless substances. A prerequisite for catalytic converters to be able to do their job well is that on the one hand a predetermined operating temperature of the respective exhaust gas catalyzer is reached and on the other hand however no overheating occurs either. For this reason it is important to determine as precisely as possible the temperature of the exhaust gas in the exhaust gas tract in which the exhaust gas catalyzer is arranged.

In addition, with modern internal combustion engines, diagnosis during the operation of the internal combustion engine is required. In this context monitoring is undertaken as to whether misfires are occurring. The causes of such misfires can differ, such as for example a fault in the injection system of the internal combustion engine, for example brought about by an undesired non-opening of the injection valve. This can then lead to an incorrect metering of fuel and thus prevent ignition of the mixture present in the cylinder. The fault can however also be caused by a fault in an ignition system of the internal combustion engine. If such misfires are detected within the framework of diagnosis this can lead to a fault being entered and to a request to the driver of the motor vehicle in which the internal combustion engine is arranged to find a workshop or also simply cause an incorrect entry which is read out within the framework of the next customer service.

A method is known from DE 199 13 746 C2 for recognizing misfires which degrade exhaust quality or damage catalyzers in internal combustion engines. A lambda probe voltage of a lambda probe arranged downstream from an exhaust gas catalyzer is determined in relation to a misfire detected. The misfire can for example be detected by investigating the uneven running. Depending on the Lambda probe voltage a misfire is then deduced as a result of a combustion error, an injection error or another type of error.

SUMMARY

A method and a device for operating an internal combustion engine can be created according to various embodiments, in which a temperature in an induction tract of the internal combustion engine can be precisely determined in each case.

According to an embodiment, a method for operating an internal combustion engine with a number of cylinders and an exhaust gas tract, in which a mixture present in the respective cylinder is brought into the respective exhaust cycles, may comprise the steps of: determining a misfire rate as a function of at least one operating variable of the internal combustion engine, and determining a temperature in the exhaust gas tract as a function of the misfire rate.

According to another embodiment, a device for operating an internal combustion engine with a number of cylinders in an exhaust gas tract, in which a mixture located in the respective cylinder is brought into the respective exhaust cycles, may be operable to determine a misfire rate as a function of at least one operating variable of the internal combustion engine and to determine a temperature in the exhaust gas tract as a function of the misfire rate.

According to a further embodiment, the temperature in the exhaust gas tract may be determined as a function of a fault causing misfires. According to a further embodiment, the temperature in the exhaust gas tract may be determined as a function of whether the fault causing the misfire lies in an ignition system or in an injection system of the internal combustion engine. According to a further embodiment, the temperature in the exhaust gas tract on explicit cutoff of a fuel delivery of at least one of the cylinders during the operation of the internal combustion engine may be determined as a function of a physical estimation model for the explicit cutoff of the fuel delivery in at least one of the cylinders and in the case of a detected misfire a characteristic value which is representative of a virtual number of cylinders with explicit cutoff of the delivery of fuel, may be determined as a function of the misfire rate and the temperature in the exhaust gas tract may be determined as a function of the characteristic value as input variable for the physical cutoff model. According to a further embodiment, the characteristic value may be determined as a function of a heat capacity ratio of a heat capacity of the mixture in the respective cylinder on a misfire to the heat capacity of air. According to a further embodiment, the characteristic value may be determined as a function of an air/fuel mixture determined for the respective misfire. According to a further embodiment, the characteristic value may be determined only in the case of a fault cause in the injection system for the misfire as a function of the heat capacity ratio. According to a further embodiment, the temperature in the exhaust gas catalyzer may be determined as the temperature in the exhaust gas tract. According to a further embodiment, depending on a determined spark time of the respective assigned spark plug, the method may determine whether a misfire is to be assigned to a fault in the ignition system.

BRIEF DESCRIPTION OF THE DRAWINGS

Exemplary embodiments of the invention are explained in greater detail below with reference to the schematic drawings. The figures show:

FIG. 1 an internal combustion engine,
FIG. 2 a flowchart of a program for detecting misfires,
FIG. 3 Calculation specifications for a residuum, FIG. 4a to 4d Signal curves, FIG. 5 further calculation specifications for the residuum, FIGS. 6 to 10 block diagrams of a functionality for determining different temperatures in a exhaust gas tract of the internal combustion engine.

Elements with identical construction or which function in the same way are identified by the same reference symbols in all figures.

DETAILED DESCRIPTION

According to various embodiments, in a method and a corresponding device for operating an internal combustion engine with a number of cylinders and an exhaust gas tract, a mixture present in the respective cylinder is brought into the respective exhaust cycles. A misfire rate is determined as a function of at least one operating variable of the internal combustion engine. A temperature in the exhaust gas tract is determined as a function of the misfire rate.

According to various embodiments, by taking account of the misfire rate, the temperature in the exhaust gas tract can be determined especially precisely. A misfire is to be understood as an undesired non-ignition of the mixture present in the respective cylinder during the combustion cycle of the respective cylinder. A decision can than be taken using the temperature in the exhaust gas tract as to whether for example cooling measures are to be undertaken in relation to the exhaust gas catalyzer in the exhaust gas tract, to prevent the latter from overheating.

In accordance with an embodiment, the temperature in the exhaust gas tract is determined depending on the error which caused the misfiring. In accordance with this embodiment, the knowledge is used that the error which caused the misfiring has an effect on the temperature in the exhaust gas tract. The temperature in the exhaust gas tract can thus be determined especially precisely.

In accordance with a further embodiment, the temperature in the exhaust gas tract is determined as function of whether the error causing the misfire lies in an ignition system or in an injection system of the internal combustion engine. In this connection use is made of the knowledge that, depending on which of these faults is present, there is an especially significant effect on the temperature in the exhaust gas tract and thus the temperature in the exhaust gas tract can be determined especially precisely.

In accordance with a further embodiment, the temperature in the exhaust gas tract for an explicit cutoff of fuel delivery of at least one of the cylinders during the operation of the internal combustion engine is determined as a function of a physical cutoff model for the explicit cutoff of the fuel delivery in at least one of the cylinders and in the case of detected misfires a characteristic value, which is representative of a virtual number of cylinders with explicit cutoff of the delivery of fuel is determined as function of the misfire rate and the temperature in the exhaust gas tract is determined depending on the characteristic value as an input variable for the cutoff model.

In this way a duplicate use of the physical cutoff model for determining the temperature in the exhaust gas tract is possible on the one hand for an explicit cutoff of the fuel delivery and on the other hand for misfires. This makes possible an especially simple implementation of taking account of the rate of misfires when determining the temperature in the exhaust gas tract.

In accordance with a further embodiment, the characteristic value is determined as a function of a heat capacity ratio of a heat capacity of the mixture in the respective cylinder with a misfire to the heat capacity of air. In this way the physical cutoff model in respect of the misfires can be used especially precisely and thus the dependency of the misfires be taken into account in determining the temperature in the exhaust gas tract very precisely.

In this connection it may be especially advantageous for the characteristic value to be determined as a function of a determined air/fuel mixture for the respective misfire. In this way the characteristic value can be determined especially precisely and thereby the temperature in the exhaust gas tract can then be determined especially precisely. Furthermore the air/fuel mixture determined before the respective misfire can be determined as a rule without any great additional effort, since at least one exhaust gas probe is generally arranged in the exhaust gas tract for detecting of the air/fuel ratio.

In accordance with a further embodiment, the characteristic value is determined only in the event of a fault caused in the injection system for the misfire as a function of the heat capacity ratio. This is based on the knowledge that, for a fault in the injection system, a deliberately especially lean mixture is detected by an exhaust gas probe which may be present, which then, in the case of an existing Lambda control, leads to a strong increase in the fuel delivered into cylinders of the internal combustion engine and thus leads overall to a greatly increased proportion of unburned fuel in the exhaust gas tract. By contrast for example, for a fault cause in the ignition system, although an unburned mixture is forced out from the respective cylinder into the exhaust gas tract with corresponding fuel components, it has been shown however that the exhaust gas probe which may be present does not signal any such heavily weakened mixture, since evidently at least in the area of the exhaust gas probe an oxidation of significant proportions of the fuel occurs. This means that, by determining the characteristic value an especially precise determination of the temperature in the exhaust gas tract can only be undertaken in the case of a fault caused in the injection system for the misfires depending of the heat capacity ratio.

In accordance with a further embodiment, a temperature in an exhaust gas catalyzer of the exhaust gas tract is determined as the temperature in the exhaust gas tract. In this way especially targeted measures for protecting the exhaust gas catalyzer can be initiated. Furthermore, by taking the misfire rate into account, an exothermy in the exhaust gas catalyzer can be estimated especially well and thus the temperature in the exhaust gas catalyzer can be defined especially precisely.

If the temperature in the exhaust gas catalyzer is determined as a function of the fault cause for the misfires, a different exothermy dependent on the fault cause can be taken into account very simply and thus the temperature in the exhaust gas catalyzer can be determined extremely precisely.

In accordance with a further embodiment, it is determined as a function of a spark ignition duration of the spark plug assigned in each case whether a misfire is to be assigned to a fault in the ignition system. In this manner the fault type can be assigned to the ignition system especially simply and precisely.

An internal combustion engine (FIG. 1) comprises an induction tract 1, an engine block 2, a cylinder head 3 and an exhaust gas tract 4. The induction tract 1 preferably comprises a throttle valve 5, also a collector 6 and an induction pipe 7 which is routed through to the cylinder Z1 via an inlet channel in the engine block 2. The engine block further comprises a crankshaft 2, which is coupled via a connecting rod 10 to the piston 11 of the cylinder Z1.

Figure 1:
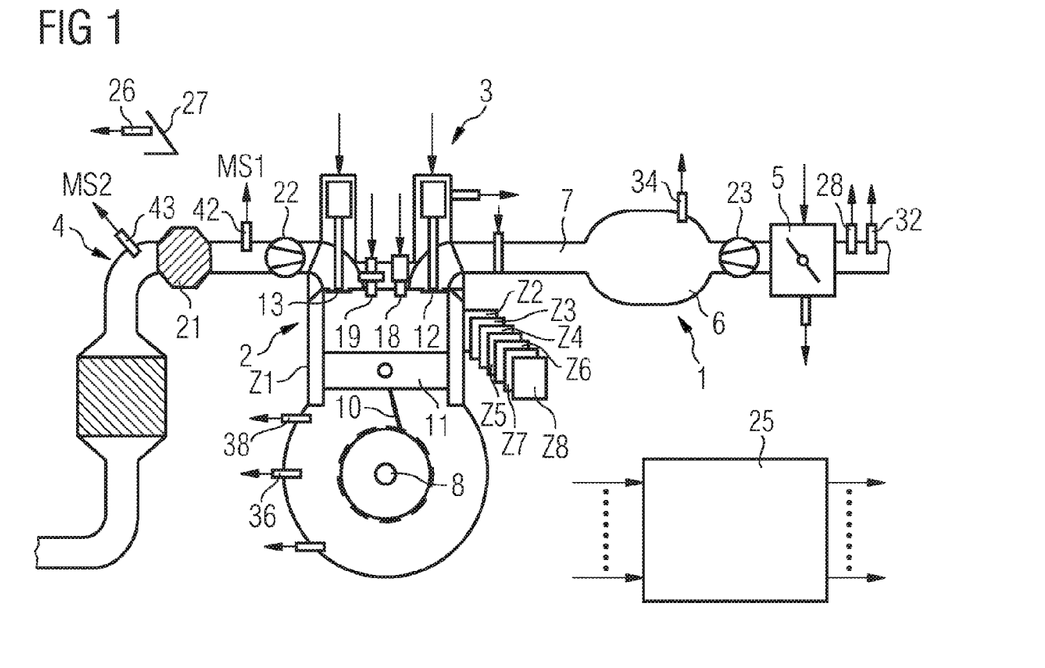

The cylinder head 3 includes valve gear with a gas inlet valve 12 and a gas exhaust valve 13.

The cylinder head 3 further comprises an injection valve 18 and a spark plug 19. Alternatively the injection valve 18 can also be arranged in the inlet manifold 7. The injection valve 18 is part of an injection system, which also includes a fuel feed device and a control for the injection valve and preferably also a fuel pump. The spark plug 19 is part of an ignition system, which also includes a control for the spark plug 19.

An exhaust gas catalyzer 4 which is embodied as a three-way catalytic converter 21 is arranged in the exhaust gas tract. A further exhaust gas catalyzer is also arranged in the exhaust gas tract, which is embodied as an NOx exhaust gas catalytic converter.

A turbine 22 of an exhaust gas turbocharger is also arranged in the exhaust gas tract which drives a compressor 23 in the induction tract 1. In addition a secondary air induction device not shown is preferably present, by means of which the fresh air can be brought into the exhaust gas tract 4.

The internal combustion engine comprises a number of cylinders Z1-Z8, which can be subdivided into a number of groups, to each of which a separate exhaust gas tract can be assigned where necessary.

A control device 25 is provided to which sensors are assigned which detect different process variables and determine the value of the measurement variable in each case. Operating variables, as well as process variables, also include variables derived from these. The control device 25 determines as a function of at least one of the measurement variables control variables, which are then converted into one or more adjustment signals for controlling the adjusting elements by means of corresponding adjusting drives. The control device 25 can also be regarded as device for control of the internal combustion engine or as device for detecting misfires.

The sensors are a pedal position sensor 26, which records a position of the gas pedal 27, an air mass sensor 28, which records an air mass flow upstream of the throttle valve 5, a first temperature sensor 32, which records an induction air temperature, an induction manifold pressure sensor 34, which records an induction manifold pressure in the collector 6, a crankshaft angle sensor 36 which records a crankshaft angle which is then assigned to an rpm N and a second temperature sensor 38 which records a coolant temperature TCO.

Furthermore a first exhaust gas probe 42 is provided, which is arranged upstream of the three-way catalyzer 21 or in the three-way catalyzer 21 and which detects a residual oxygen content of the exhaust gas and of which the measuring signal, the first measuring signal MS1, is characteristic for the air/fuel ratio in the combustion chamber of the assigned cylinder or cylinders Z1-Z8 and upstream of the first exhaust gas probe 42 of the exhaust gas tract 4 before oxidation of the fuel.

Furthermore a second exhaust gas probe 43 is provided, which is arranged downstream of the three-way catalyzer 42 and which detects a residual oxygen content of the exhaust gas and of which the measuring signal, the second measuring signal MS2, is characteristic for the air/fuel ratio in the combustion chamber of the assigned cylinders Z1-Z8 and upstream of the second exhaust gas probe 43 before oxidation of the fuel. The first exhaust gas probe 42 is preferably a linear Lambda probe, but can for example also be a binary Lambda probe. The second exhaust gas probe 43 is a binary Lambda probe. It can however also be a linear Lambda probe.

Depending on the embodiment, any subset of said sensors can be present or additional sensors can also be present.

The actuators are for example the throttle flap 5, the gas inlet and gas exhaust valve 12, 13, the injection valve 18, the spark plug 19 or the turbine 22.

The actuators and sensors are especially shown in respect of cylinder Z1 in FIG. 1. The further cylinders are preferably also assigned other corresponding actuators and where necessary sensors. Preferably each cylinder is assigned an injection valve 18 and a spark plug 19 in this way.

Preferably the control device 25 includes a Lambda control, which is part of a Lambda controller, and also a trim control which is part of a trim controller.

This type of trim controller and this type of Lambda controller with a linear Lambda probe which is arranged upstream from an exhaust gas catalyzer and a binary Lambda probe which is arranged downstream from an exhaust gas catalyzer are known from the German textbook, "Handbuch Verbrennungsmotor (Handbook of the internal combustion engine)", published by Richard von Basshuysen, Fred Schäfer, 2nd edition, Vieweg & Sohn Verlagsgesellschaft mbH, June 2002, Pages 559-561. A Lambda setpoint value is filtered by means of a filter which takes account of gas delay times and the sensor behavior. The Lambda setpoint value filtered in this way is the guide value of a PII2D Lambda control, of which the manipulated variable is an injection volume correction. An actual Lambda value derived from the measuring signal of the linear Lambda probe forms, together with the filtered Lambda setpoint value, the control difference of the Lambda controller. The contents of the textbook "Handbuch Verbrennungsmotor" is thus also included in respect of the trim controller and the Lambda controller.

Figure 2:
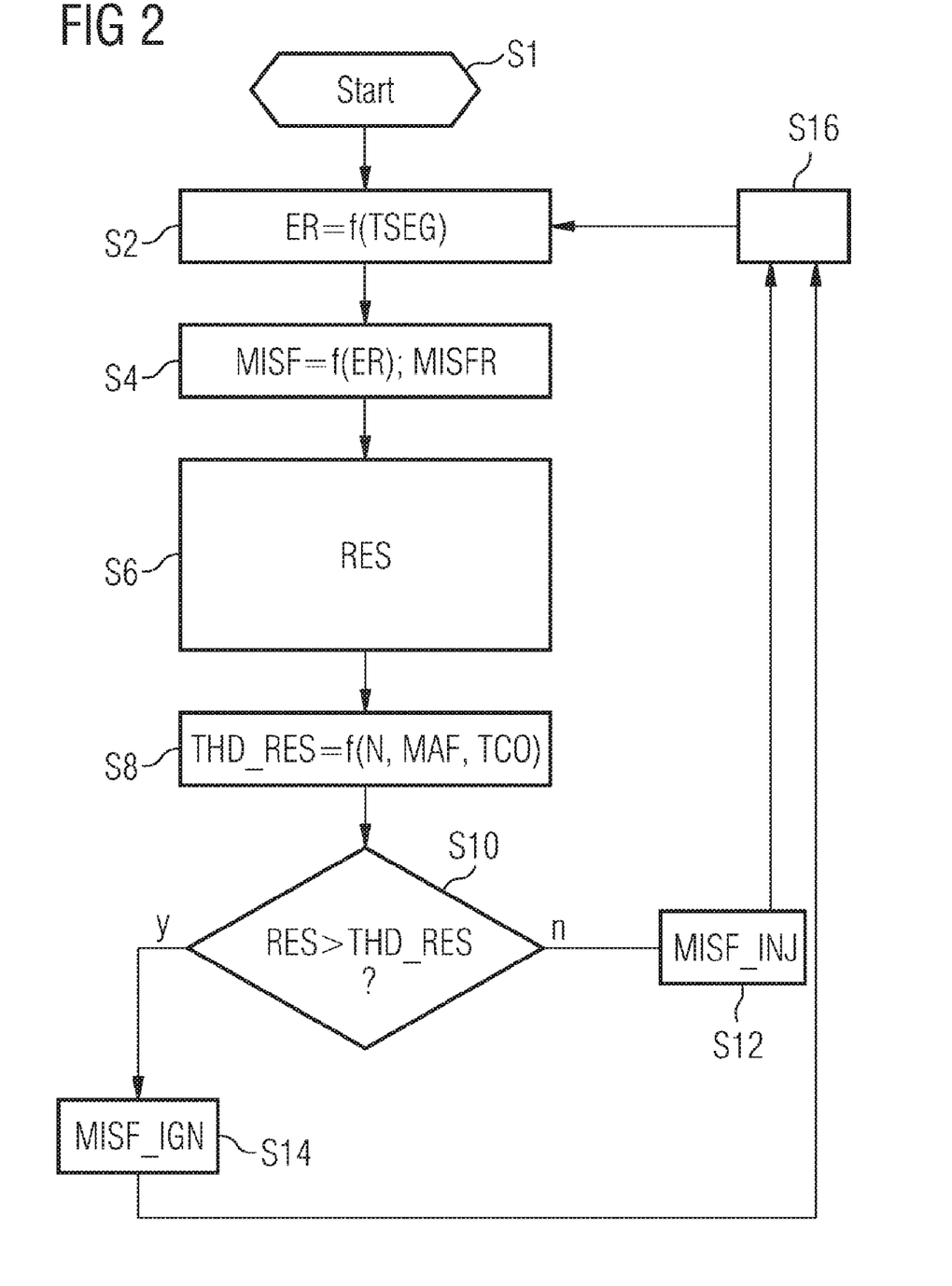

To detect misfires a program is stored in the control device 25 and is run during operation; this is explained below in greater detail with reference to the flowchart of FIG. 2. The program is started in a step S1, preferably at the time that the internal combustion engine is started. Variables can be initialized if necessary in step S1.

In a step S2 an uneven running error ER is determined. This is preferably done as a function of the progress of the engine rpm N. Especially preferably time segments TSEG able to be allocated to the individual cylinders Z1-Z8 are evaluated for this purpose. A time segment TSEG correlates to a crankshaft angle range which is assigned to the respective cylinder Z1-Z8 and the crankshaft angle of which depends on the number of cylinders of the internal combustion engine and the type of the internal combustion engine. The crankshaft angular range corresponds for example for an internal combustion engine with eight cylinders Z1-Z8 which is operated in the four-stroke cycle to a 90 degree crankshaft angle.

The uneven running ER can for example be determined as a function of a deviation of the time segment TSEG of an average time segment assigned to the respective cylinder.

In a step S4 a misfire MISF is then detected and this is done as a function of the uneven running ER. To this end for example the uneven running ER can be compared with a predeterminable value, the exceeding of which is characteristic for the misfire MISF. Furthermore in step S4 a misfire rate MISFR is determined. This can for example be done, for consecutive passes of step S4, by setting the misfires MISF detected in the previous passes in relation to the total number of passes of step S4 occurring during the observed period.

The following steps are preferably only executed if a misfire MISF was detected in step S4.

In a step S6 a residuum RES is determined and this is done as a function of a cylinder-specific spark combustion time of a spark plug which is assigned in the cylinder in which the misfire was detected, and a function of further cylinder-specific spark combustion times of other spark plugs which are assigned to other cylinders.

The residuum RES is a measure of the cause of the fault for the misfire MISF in one of the cylinders Z1 to Z8 detected in step S4. The determination of the residuum RES is explained in greater detail below with reference to FIG. 3. A cause of a fault in the ignition system can be detected as a function of the residuum RES. The residuum RES can additionally also be determined as a function of a control difference of a Lambda controller and/or as a function of a manipulated variable of Lambda controller and/or as a function of a trim control intervention of a trim controller.

The residuum RES is preferably determined in each case in relation to that cylinder Z1 to Z8 in which a misfire was detected in the step S4.

In a step S8 a diagnosis threshold THD_RES is determined, and this is preferably done as a function of the rpm N and/or the air mass flow MAF and/or a coolant temperature TCO. One or more engine maps can be provided for this purpose for example, which have been determined beforehand by trials, on a motor test bench for example, or for example also determined through simulations, with this having been done such that, when the diagnosis threshold value THD_RES is exceeded by the residuum RES the cause of the fault lies in the ignition system and especially preferably, if the diagnosis threshold value THD RES is not reached by the residuum RES the cause of the fault lies in the injection system. By taking into account the coolant temperature TCO, a high level of certainty can be guaranteed in detection of the cause of the fault in the ignition system especially close to the time of a cold start. Taking the coolant temperature into account in determining the diagnosis threshold THD_RES enables account to be taken of the fact that the coolant temperature is representative in predetermined operating states for a temperature of the spark plugs. The misfire behavior with a damaged spark plug depends on the temperature of the spark plugs.

In a step S10 a check is then performed as to whether the residuum RES is greater than the diagnosis threshold value THD_RES. If it is, in a step S14 a fault is detected in the ignition system, a fact which is signaled by setting an ignition system misfire flag MISF_IGN. Subsequently processing is continued in a step S16 in which the program waits if necessary for a predeterminable waiting time or a predeterminable crankshaft angle before processing is started once again at step S2. If the condition of step S10 is not met, a fault in the injection system is preferably detected in a step S12, a fact which is signaled by setting an injection system misfire flag MISF_INJ. Subsequently processing is continued at step S16.

In the processing of steps S2 to S16 it should be ensured in any event, as regards the timing of their execution sequence, that the individual calculations are undertaken frequently enough for any misfire MISF which might occur to be able to be detected for each cylinder of the internal combustion engine. In addition any process variables or operating variables which might be needed are also detected in parallel with the execution of steps S2 to S16 and are buffered if necessary. Above and beyond this the functionality as demonstrated by the flowchart depicted in FIG. 2 can also be present more than once in the control device 25 and thus be present especially for groups of cylinders Z1 to Z8 or also individually for individual cylinders Z1 to Z8.

Figure 3:
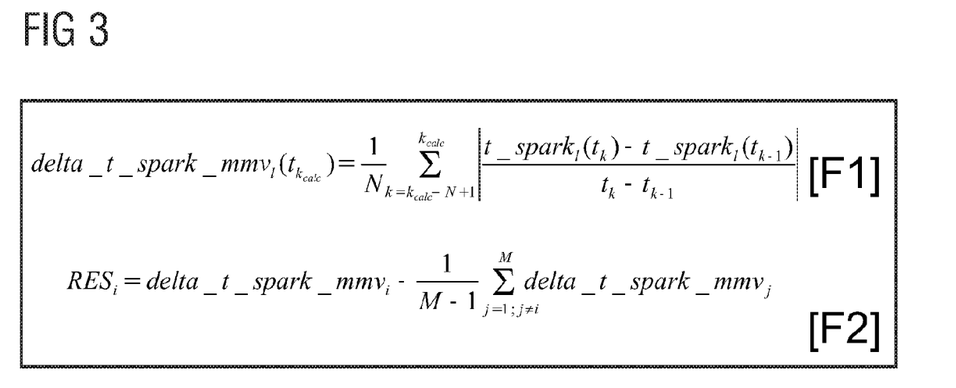

FIG. 3 specifies calculation specifications for determining the residuum RES.

In relation to the calculation specifications F1 to F4 for determining the residuum RES explained in greater detail below, the index i stands for that cylinder for which the misfire MISF was detected during the processing of step S4, while index j represents other cylinders which can also be assigned if necessary to the same group or also to any other given group of cylinders Z1 to Z8.

The residuum RES can also still be determined as a function of the control difference of the Lambda controller and/or a manipulated variable of the Lambda controller and/or of the trim control intervention of the trim controller. In such cases for example the knowledge can be utilized that for a misfire caused by a fault in the injection system, especially of an injection valve, a very large control difference of the Lambda controller occurs, which is especially greater than that which occurs if the misfire is caused by a fault in the ignition system. The same then also applies to the manipulated variable of the Lambda controller.

Figure 4A:
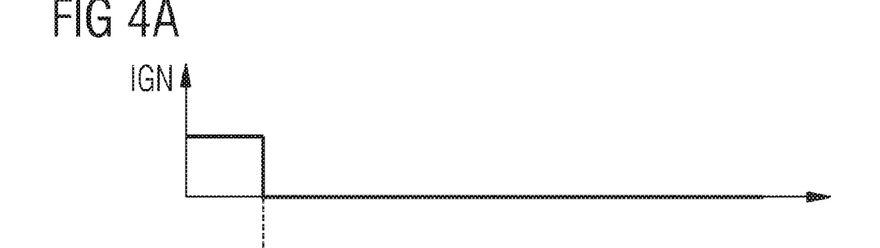
Figure 4B:
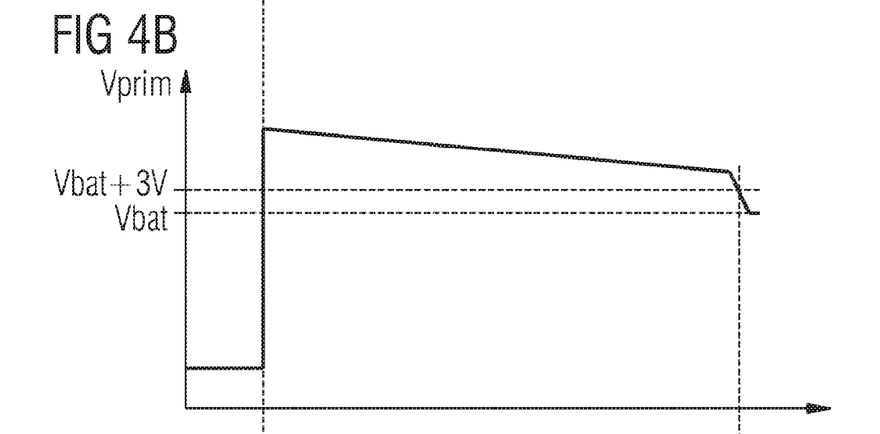
Figure 4C:
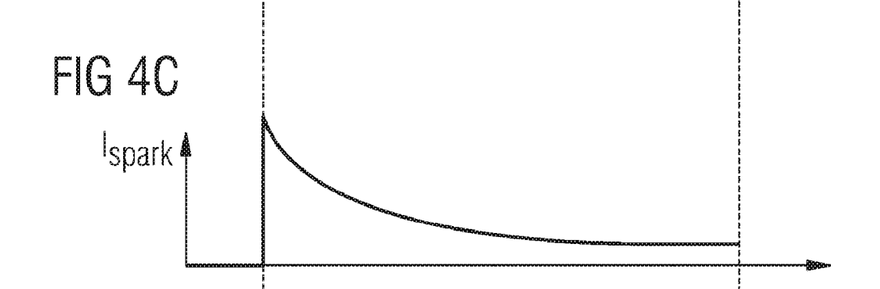
Figure 4D:
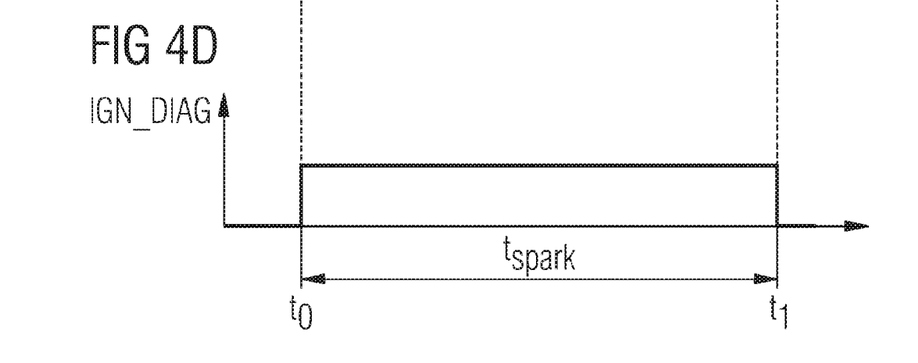

A brief explanation is given below with reference to FIGS. 4A to 4D of signal curves in conjunction with an activation of a spark plug At a point in time $t_0$ a charge current of an ignition coil of the spark plug 19 is cut off by an IGBT (insulated gate bipolar transistor) provided for the purpose; this can be seen from the curve of f IGN in FIG. 4A. An ignition voltage subsequently builds up on a secondary side through self-induction of the ignition coil.

The voltage builds up until the onset of a flashover at the spark path of the spark plug 19. VPRIM indicates the voltage of the primary side. VBAT indicates a supply voltage, especially a battery voltage. $I_{spark}$ indicates a secondary-side current. The spark voltage builds up on a secondary side through self-induction of the ignition coil. The voltage builds up until the onset of the flashover on the spark path of the spark plug. Until the ignition spark extinguished at a point in time $t_1$ the secondary side current $I_{spark}$ flows. The current flow leads via induction to an increased voltage on the primary side. The spark time $t_{spark}$ is the time during which the primary-side voltage exceeds a threshold value, for example the supply voltage plus three volts. Information about the fulfillment of these conditions is made available by a signal IGN_DIAG of the control device 25. Signal IGN_DIAG is created accordingly for all spark plugs of all cylinders Z1 to Z8.

An average spark time fluctuation delta_t_spark_mmv is determined by means of a calculation rule F1 (FIG. 3) and this is preferably done for all cylinders of the internal combustion engine. M indicates the number of cylinders including that cylinder at which the misfire MISF was detected during the processing of step S4. M can for example correspond to the total number of the cylinders Z1 to Z8 of the internal combustion engine. N is a predetermined number of sampling steps, which are preferably spaced from each other in accordance with the duration of a working cycle. The index I is a placeholder for a given cylinder Z1 to Z8. $t_{kcalc}$ can be any given point in time.

A high deviation of the average spark time fluctuation delta_t_spark_mmv of a cylinder from the mean value of the average spark time fluctuations delta_t_spark_mmv of other cylinders is characteristic for an ignition system fault affecting a cylinder Z1 to Z8. The residuum RES is determined by means of a set of calculation rules F2. The determination of the residuum RES can be undertaken independently of the occurrence of misfires basically at any given point in time.

In accordance with further calculation rules F3, F4, the residuum RES can also be determined as an alternative or in addition. An average spark time t_spark_mmv is determined by means of a calculation specification F3 (FIG. 5) and this is preferably done for all cylinders of the internal combustion engine. M indicates the number of cylinders including that cylinder at which the misfire MISF was detected during the processing of step S4. M can for example correspond to the total number of the cylinders Z1 to Z8 of the internal combustion engine. N is the predetermined number of sampling steps, which are preferably spaced from each other in accordance with the duration of a working cycle. The index I is a placeholder for a given cylinder Z1 to Z8. $t_{kcalc}$ can be any given point in time.

Figure 5:
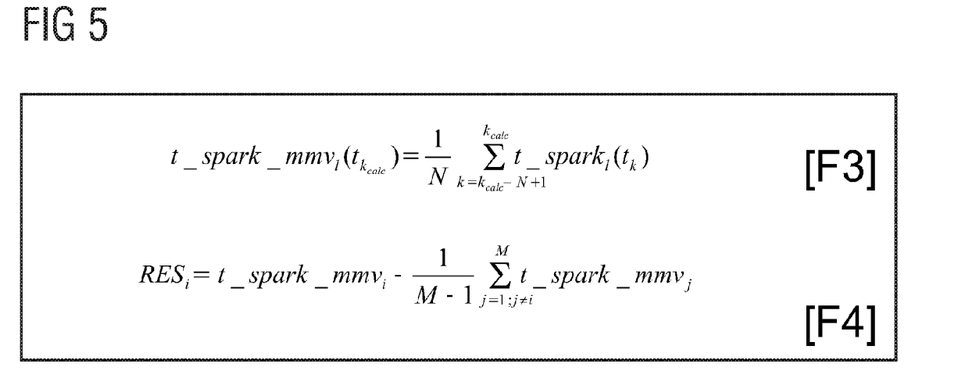

A high deviation of the average spark time fluctuation delta_t_spark_mmvi of a cylinder from the mean value of the average spark time fluctuations delta_t_spark_mmvj of other cylinders is characteristic for an ignition system fault affecting a cylinder Z1 to Z8. The residuum RES is then determined by means of a calculation specification F4.

With reference to FIGS. 6 to 10, on the basis of the block diagrams depicted in said figures, a functionality for determining a temperature in the exhaust gas tract 4 is explained in greater detail, said functionality preferably being stored in the form of program in the control device 25 and processed in the control device 25 during the operation of the internal combustion engine.

In a block B1 (FIG. 6), depending on the first measuring signal MS1 of the first exhaust gas probe 42 and preferably using the information obtained in step S2 or S4 respectively about the presence of the misfire MISF and thereby also of the point in time to be assigned to it, an air/fuel-ratio LAM_MISF_LR during the misfire is determined. This is then supplied to a block B2 as an input variable for which a specific heat capacity of air CP_LUFT and a specific heat capacity of fuel CP_FUEL are supplied as further input variables, which are preferably predetermined variables. Depending on the input variables of block B2 a heat capacity ratio CP_RATIO of the heat capacity of the mixture in the respective cylinders Z1 to Z8 during the misfire MISF to the heat capacity of air CP_LUFT is determined. This is preferably done in accordance with the calculation specification specified in block B2.

Figure 6:
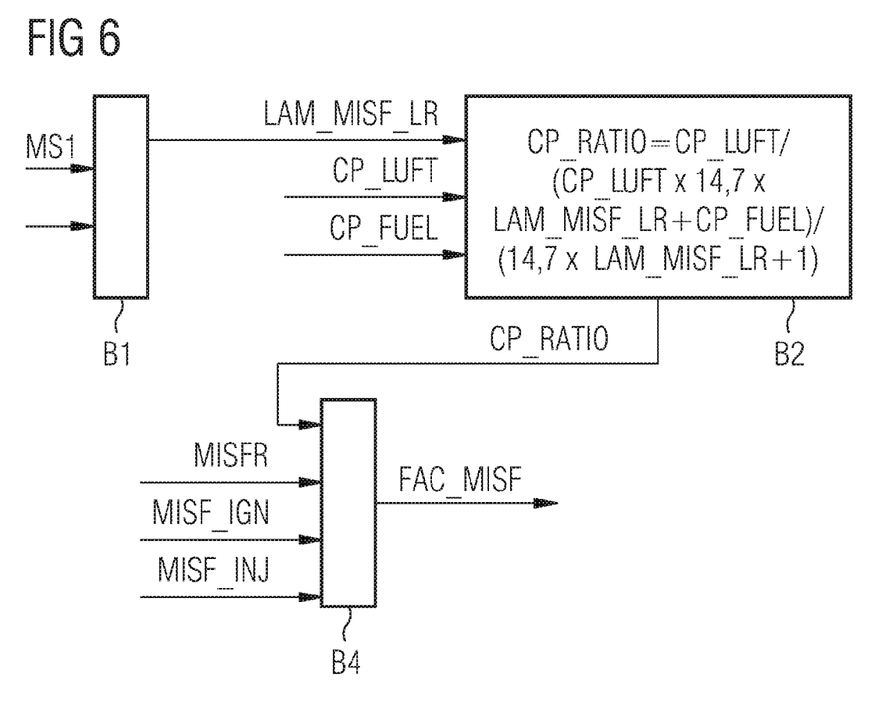

A block B4 is provided in which depending on the heat capacity ratio CP_RATIO of the misfire rate MISFR and on the ignition system misfire flag MISF_IGN and the injection system misfire flag MISF_INJ or at least one of the two, a motor correction value FAC_MISF is determined. Preferably the block B4 is embodied in this context so that the motor correction value FAC_MISF is assigned the misfire rate MISFR if the fault does not lie in the injection system but especially in the ignition system. By contrast the motor correction value FAC_MISF is preferably assigned the product of the misfire rate MISFR and the heat capacity ratio CP_RATIO, if the misfire is attributable to a fault in the injection system. In this way account can be taken in a particularly precise manner of the fact that with a fault in the injection system, especially with an injection valve, which leads to an extremely small delivery of fuel to the respective cylinder or to no delivery at all, because of the Lambda controller a significantly greater delivery of fuel occurs through the injection valves assigned to other cylinders Z1 to Z8 of the internal combustion engine. The result of this in its turn is that an increased proportion of uncombusted fuel gets into the exhaust gas tract and thus the specific heat capacity of the mixture in the exhaust gas tract also markedly depends of the specific heat capacity of the fuel CP_FUEL.

Figure 7:
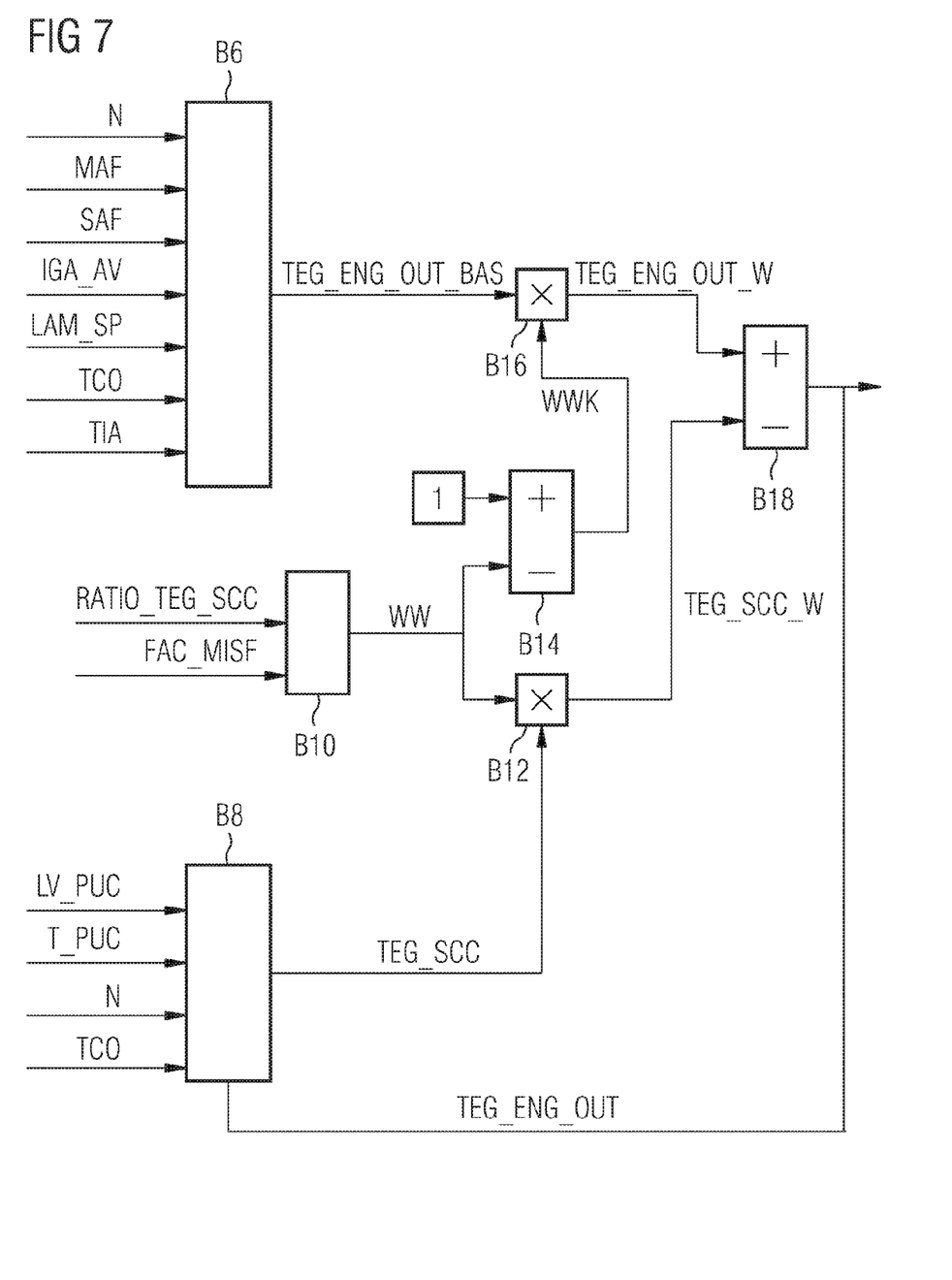

FIG. 7 depicts a further block diagram for determining a motor temperature TEG_ENG_OUT, which is representative of the temperature of the mixture when exhausted from the respective combustion chamber of the cylinder into the exhaust gas tract 4, with this being understood especially as the average temperature across the respective cylinders Z1-Z8.

In a block B6 a basic motor temperature TEG_ENG_OUT_BAS is determined, and indeed that of the mixture in the exhaust gas tract on outflow from the respective combustion chambers into the respective cylinders Z1 to Z8, as a function of the input variables of block B6. The input variables of the block B6 are the rpm N, the air mass flow MAF, a secondary air mass flow SAF, which is supplied via the secondary air blower device is supplied to the exhaust gas tract 4, an actual ignition angle value IGA_AV, in which the spark edge at the respective spark plugs 19 is actually created, a setpoint air/fuel-ratio LAM_SP, which is especially to be set by means of the Lambda control controller in the respective cylinders Z1 to Z8 of the internal combustion engine, the coolant temperature TCO and the induction air temperature TIA. Input variables of the block B6 can also be a subset of or additional to the listed operating variables. Instead of the setpoint air/fuel ratio LAM_SP, an actual air/fuel-ratio can also be an input variable of the block B6, which is derived from the first measuring signal MS1, especially if the first exhaust gas probe 42 is a linear Lambda probe.

Preferably further engine maps are provided in the block B6, which are determined beforehand by trials for example on a motor test bench or through simulations and which are predetermined so that through a likewise predetermined logical combination of their output variables the basic motor temperature TEG_ENG_OUT can be determined. Preferably for example an engine map is provided of which the input variables are the rpm N and the air mass flow MAF. Preferably further engine maps are also provided of which the input variables are likewise the rpm N and the air mass flow MAF and preferably a further engine map is provided of which the input variables of the secondary air mass flow SAF and the air mass flow.

The output variables of the engine map are logically combined additively or multiplicatively with each other and/or with the further input variables of the block B6 so that the basic motor temperature TEG_ENG_OUT is determined. Block B6 thus includes a physical model of the exhaust gas tract in respect of the temperature of the mixture on the input side of the exhaust gas tract 4 assuming that in all cylinders Z1 to Z8 of the internal combustion engine one combustion currently occurs per working cycle in the cylinders assigned to one exhaust bank.

A block B8 includes a physical cutoff model for the explicit cutoff of the fuel delivery in all cylinders which are assigned to the respective exhaust gas bank. The input variables of the block B8 are an overrun cutoff flag LV_PUC, which is representative for the desired explicit cutoff of the fuel delivery to the respective cylinder during the regular operation of the internal combustion engine. This preferably occurs when a motor vehicle in which the internal combustion engine is arranged is driving uphill, and while the desired torque to be generated by the internal combustion engine and to be output to the crankshaft is negative in order to create a braking effect in this way.

Further input variables of the block B8 are a time T_PUC since the beginning of the cylinder cutoff, the rpm N and the coolant temperature TCO. In block B8 a cylinder cutoff end temperature TEG_SCC is determined as a function of its input temperature, which in the case of cutting off all cylinders assigned to the respectively assigned exhaust bank sets itself after execution of the time T_PUC since the beginning of the cylinder cutoff.

For the purposes of determining the cylinder cutoff end temperature TEG_SCC corresponding engine maps are provided in block B8 and especially also logical specifications which are preferably determined empirically.

A block B10 is provided which is embodied so as to determine a weighting value WW as a function of a cylinder cutoff ratio RATIO_TEG_SCC between those cylinders in which explicitly no fuel is delivered to the total number of the assigned cylinders. The weighting value WW is further determined in block B10 as a function of the motor correction value FAC_MISF which preferably has a range of values between zero and one. The same applies to the range of values of the cylinder cutoff ratio RATIO_TEG_SCC.

Preferably in the block B10 the weighting value WW is assigned the cylinder cutoff ratio RATIO_TEG_SCC in the case of the explicit cutoff of the fuel delivery to individual cylinders, whereas otherwise the weighting value WW is assigned the motor correction value FAC_MISF. It is however also possible if necessary for the weighting value to be assigned a combination of the motor correction value FAC_MISF and the cylinder cutoff ratio RATIO_TEG_SCC.

In a block B12 a multiplier is embodied which determines the product from the weighting value and the cylinder cutoff end temperature TEG_SCC and assigns this a weighted cylinder cutoff end temperature TEG_SCC_W. In a block B14 a complementary weighting value WWK is determined which is complementary to the weighting value WW. Preferably this is done by forming the difference from the value one and the weighting value WW.

In a block B16 a multiplier is embodied by means of which a weighted basic motor temperature TEG_ENG_OUT_W is determined by multiplying the basic motor temperature TEG_ENG_OUT_BAS by the complementary weighting value WWK.

In a block B18 the engine temperature TEG_ENG_OUT is then determined by forming the difference between the weighted basic engine temperature TEG_ENG_OUT_W and the weighted cylinder cutoff end temperature TEG_SCC_W.

The blocks B8, B10, B12, B14 reproduce a physical cutoff model for the explicit cutting off of the fuel delivery in at least one of the cylinders and simultaneously a use of this physical cutoff model for taking account of the influence of the misfire is given. The motor correction value FAC_MISF in this connection represents a possible characteristic value, which is representative for a virtual number of cylinders with explicit cutting off of the delivery of fuel.

Figure 8:
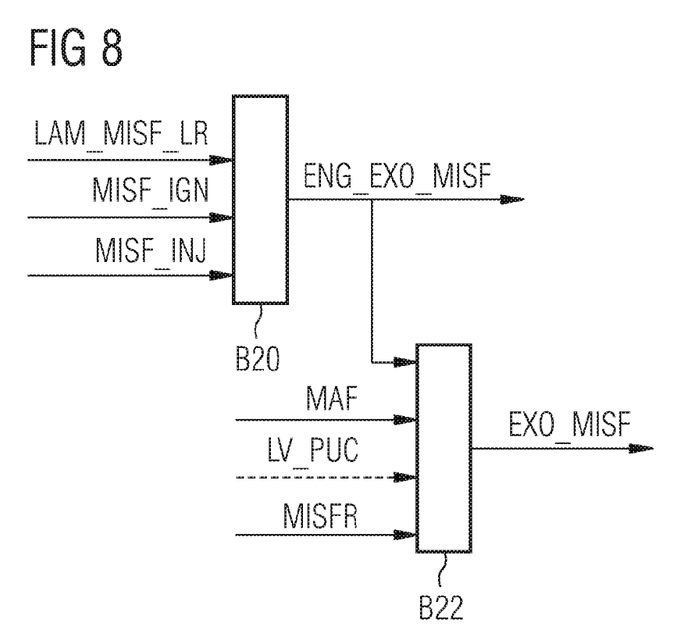

FIG. 8 shows a block diagram for determining an exhaust gas catalyzer correction value EXO_MISF. Input variables of a block B20 are the air/fuel-ratio LAM_MISF_LR for a misfire, the ignition system misfire flag MISF_IGN and the injection system misfire flag MISF_INJ. Preferably block B20 includes a characteristic curve in each case for determining the intermediate correction value ENG_EXO_MISF for the case in which the ignition system misfire flag MISF_IGN or the injection system misfire flag MISF_INJ are set respectively. These characteristic curves are preferably empirically determined, as are the other characteristic curves and engine maps.

A block B22 is also provided in which an exhaust gas catalyzer correction value EXO_MISF is determined as a function of the intermediate correction value ENG_EXO_MISF and preferably as a function of the air mass flow MAF and where necessary as a function of the cylinder cutoff flag LV_PUC. Preferably the catalyzer correction value EXO_MISF has the dimension of the energy. In addition the misfire rate MISFR is also provided as a further input variable for block 22. The catalyzer correction value EXO_MISF thus preferably represents energy that can be released in the exhaust gas catalyzer by an exothermic reaction and thus leads to a change of the temperature in the exhaust gas catalyzer. The characteristic curves of blocks B20 and B22 or of the engine maps and the calculation specifications within these blocks are likewise empirically determined.

A block B26 (FIG. 9) gives a physical model of the exhaust gas tract, from the outlet of the cylinder Z1 to Z8 through to the exhaust gas catalyzer. In this case a tubular body is essentially involved as regards the exhaust gas tract and in the case of the presence of the exhaust gas turbocharger additionally the turbine 22. Input variables of the block B26 are the engine temperature TEG_ENG_OUT, the rpm N, the air mass flow MAF, the speed of the vehicle VS, the ambient temperature T_AMB and a turbine power POW_TUR of the turbine 22. The vehicle speed VS can for example be determined as a function of the rpm N, the transmission ratio of a transmission of the vehicle in which the internal combustion engine is arranged and the wheel circumferences of the wheels of the vehicle. It can however also be determined in another manner known to the person skilled in the art for these purposes.

Figure 9:
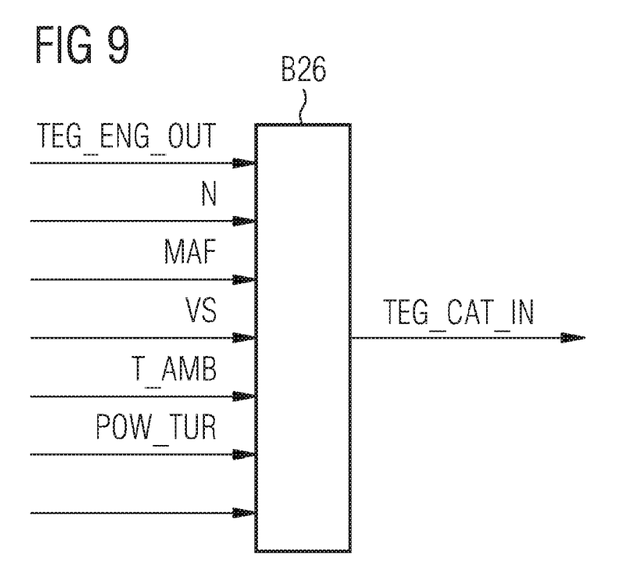

The ambient temperature T_AMB can for example be detected by means of a suitable ambient temperature sensor or also estimated by means of a corresponding physical model as a function of the temperature of the induction air TIA. The turbine power POW_TUR can for example be determined by means of known engine maps as a function of the rpm N and the air mass flow MAF.

By means of the engine temperature TEG_ENG_OUT, the rpm N and the air mass flow MAF, in the model embodied by the block B26 a thermal energy entry in the part of the exhaust gas tract which is located upstream of the exhaust gas catalyzer can be taken into account. By means of the vehicle speed VS and the ambient temperature T_AMB a removal of thermal energy can be determined in respect of the mixture located in the exhaust gas tract which is instigated from outside by cooling down of the air flowing around the internal combustion engine. The turbine power POW_TUR represents a further energy release instigated by the energy needed to drive the turbine. The circumstances for determining the catalyzer input temperature TEG_CAT_IN can likewise be determined empirically for the block B26. The model depicted in the block B26 can also be referred as a combined pipe turbine model.

Figure 10:
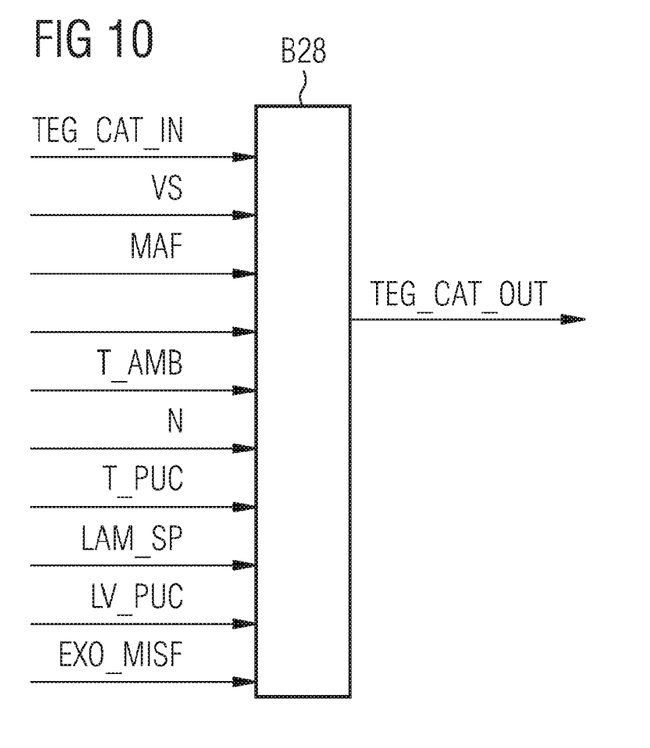

A physical model of the exhaust gas catalyzer in respect of the temperature within the exhaust gas catalyzer is provided by a block B28 (FIG. 10). The output variable of block B28 is an exhaust gas catalyzer output temperature TEG_CAT_OUT, which is especially representative for the temperature of the mixture in the exhaust gas catalyzer and thus also especially for the temperature of the exhaust gas catalyzer in the area of its catalytically effective surface.

Input variables of block B28 are the exhaust gas catalyzer input temperature TEG_CAT_IN, the vehicle speed VS, the air mass flow MAF, the ambient temperature T_AMB, the rpm N, a time T_PUC since the beginning of the cylinder cutoff, the setpoint air/fuel ratio LAM_SP, the flag for cylinder cutoff LV_PUC and the exhaust gas catalyzer correction value EXO_MISF. The relationship between the input variables and the exhaust gas catalyzer output temperature TEG_CAT_OUT is also determined empirically in block B28, with taking account of the exhaust gas catalyzer correction value EXO_MISF covering a major influence on the misfires on the exhaust gas catalyzer output temperature TEG_CAT_OUT. Input variables of blocks B26 or B28 can also be a subset of the said values or be additional to them.

Depending on the engine temperature TEG_ENG_OUT determined and/or the exhaust gas catalyzer input temperature TEG_CAT_IN and/or the exhaust gas catalyzer output temperature TEG CAT OUT different control functions can then be performed by the control device 25. The engine output temperature TEG_ENG_OUT, the exhaust gas catalyzer input temperature TEG_CAT_IN and the exhaust gas catalyzer output temperature TEG_CAT_OUT represent all temperatures of the exhaust gas tract 4. The control functions which can be performed as a function of a temperature or a combination of the temperatures of the exhaust gas tract can for example be a protection function for the exhaust gas catalyzer which for example can be realized by changing the setpoint air/fuel ratio LAM_SP.

The invention claimed is:

1. A method for operating an internal combustion engine with a number of cylinders and an exhaust gas tract, in which a mixture present in the respective cylinder is brought into the respective exhaust cycles, with the method comprising the steps of:
   determining a misfire rate as a function of at least one operating variable of the internal combustion engine, and
   determining a temperature in the exhaust gas tract as a function of the misfire rate and as a function of whether the fault causing the misfire lies in an ignition system or in an injection system of the internal combustion engine.

2. The method according to claim 1, wherein, depending on a determined spark time of the respective assigned spark plug, it is determined whether a misfire is to be assigned to a fault in the ignition system.

3. A device for operating an internal combustion engine with a number of cylinders in an exhaust gas tract, in which a mixture located in the respective cylinder is brought into the respective exhaust cycles, to the device being operable to
   determine a misfire rate as a function of at least one operating variable of the internal combustion engine, and to
   determine a temperature in the exhaust gas tract as a function of the misfire rate and as a function of whether the fault causing the misfire lies in an ignition system or in an injection system of the internal combustion engine.

4. The device according to claim 3, being further operable to determine, depending on a determined spark time of the respective assigned spark plug, whether a misfire is to be assigned to a fault in the ignition system.

5. A method for operating an internal combustion engine with a number of cylinders and an exhaust gas tract, in which a mixture present in the respective cylinder is brought into the respective exhaust cycles, with the method comprising the steps of:
   determining a misfire rate as a function of at least one operating variable of the internal combustion engine, and
   determining a temperature in the exhaust gas tract as a function of the misfire rate, wherein the temperature in the exhaust gas tract on explicit cutoff of a fuel delivery of at least one of the cylinders during the operation of the internal combustion engine is determined as a function of a physical estimation model for the explicit cutoff of the fuel delivery in at least one of the cylinders and in the case of a detected misfire a characteristic value which is representative of a virtual number of cylinders with explicit cutoff of the delivery of fuel, is determined as a function of the misfire rate and the temperature in the exhaust gas tract is determined as a function of the characteristic value as input variable for the physical cutoff model.

6. The method according to claim 5, wherein the temperature in the exhaust gas tract is determined as a function of a fault causing misfires.

7. The method according to claim 5, wherein the characteristic value is determined as a function of an air/fuel mixture determined for the respective misfire.

8. The method according to claim 5, wherein the temperature in the exhaust gas catalyzer is determined as the temperature in the exhaust gas tract.

9. The method according to claim 5, wherein, depending on a determined spark time of the respective assigned spark plug, it is determined whether a misfire is to be assigned to a fault in the ignition system.

10. The method according to claim 5, wherein the characteristic value is determined as a function of a heat capacity ratio of a heat capacity of the mixture in the respective cylinder on a misfire to the heat capacity of air.

11. The method according to claim 10, wherein the characteristic value is determined only in the case of a fault cause in the injection system for the misfire as a function of the heat capacity ratio.

12. A device for operating an internal combustion engine with a number of cylinders in an exhaust gas tract, in which a mixture located in the respective cylinder is brought into the respective exhaust cycles, to the device being operable to
   determine a misfire rate as a function of at least one operating variable of the internal combustion engine,
   determine a temperature in the exhaust gas tract as a function of the misfire rate, wherein the temperature in the exhaust gas tract is determined on explicit cutoff of a fuel delivery of at least one of the cylinders during the operation of the internal combustion engine as a function of a physical estimation model for the explicit cutoff of the fuel delivery in at least one of the cylinders, and
   in the case of a detected misfire, to determine a characteristic value which is representative of a virtual number of cylinders with explicit cutoff of the delivery of fuel, as a function of the misfire rate and to determine the temperature in the exhaust gas tract as a function of the characteristic value as input variable for the physical cutoff model.

13. The device according to claim 12, being further operable to determine the temperature in the exhaust gas tract as a function of a fault causing misfires.

14. The device according to claim 12, being further operable to determine the characteristic value as a function of an air/fuel mixture determined for the respective misfire.

15. The device according to claim 12, being further operable to determine the temperature in the exhaust gas catalyzer as the temperature in the exhaust gas tract.

16. The device according to claim 12, being further operable to determine, depending on a determined spark time of the respective assigned spark plug, whether a misfire is to be assigned to a fault in the ignition system.

17. The device according to claim 12, being further operable to determine the characteristic value as a function of a heat capacity ratio of a heat capacity of the mixture in the respective cylinder on a misfire to the heat capacity of air.

18. The device according to claim 17, being further operable to determine the characteristic value only in the case of a fault cause in the injection system for the misfire as a function of the heat capacity ratio.

* * * * *